Nov. 22, 1960 R. J. ROWLEY 2,961,532

NEGATIVE AND POSITIVE NOISE LIMITER

Filed April 24, 1957

INVENTOR.
ROBERT J. ROWLEY

BY Moody and Goldman

ATTORNEYS

United States Patent Office 2,961,532

Patented Nov. 22, 1960

2,961,532

NEGATIVE AND POSITIVE NOISE LIMITER

Robert J. Rowley, Cedar Rapids, Iowa, assignor to Collins Radio Company, Cedar Rapids, Iowa, a corporation of Iowa Filed Apr. 24, 1957, Ser. No. 654,804

4 Claims. (Cl. 250—20)

This invention relates generally to noise-limiting circuits which utilize shunt clipping of noise pulses that exceed the level of a given percentage of modulation.

Noise is often superimposed on received amplitude-modulated signals. The noise is generally of a random nature and usually occurs in pulsed form. With respect to the alternating-current axis of the radio-frequency signal, the noise occurs in both a negative and positive manner. After detection, positive and negative noise pulses remain with an amplitude that exceeds the level of modulation, where it is less than 100 percent. While the unidirectionality of the non-linear detecting operation in amplitude-modulated receivers attenuates noise pulses of one polarity much more than noise pulses of the opposite polarity, the detector clipping level is not less than the 100 percent modulation level.

This invention provides a noise-clipping circuit which clips both positive and negative noise pulses at a level, which can be any given percentage of modulation of the received signal that is less than 100 percent.

The invention uses three resistance paths connected in parallel to the output of a detector in an amplitude-modulation receiver, wherein a pair of diodes are connected between intermediate points on the resistance paths. The required proportioning and diode connections to the resistance paths are taught below.

Figure 1:
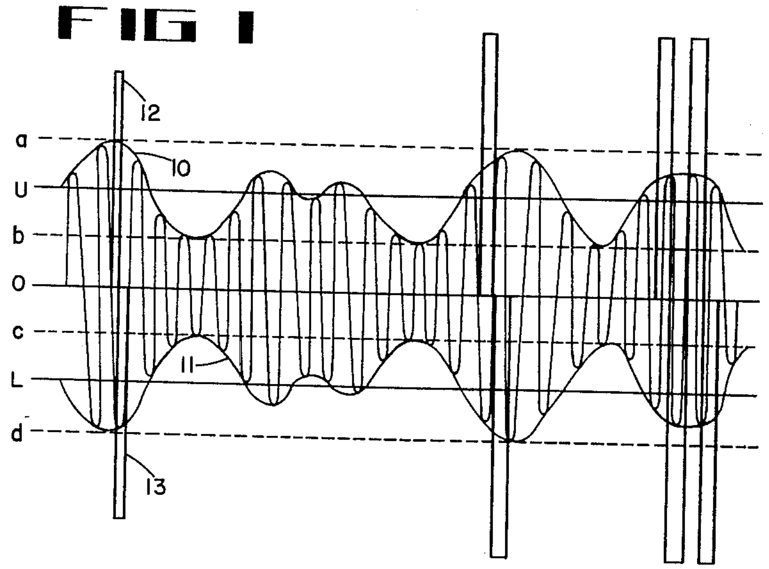
Figure 2:
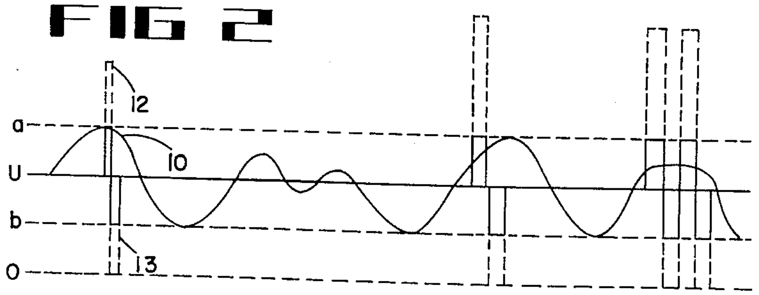
Figure 3:
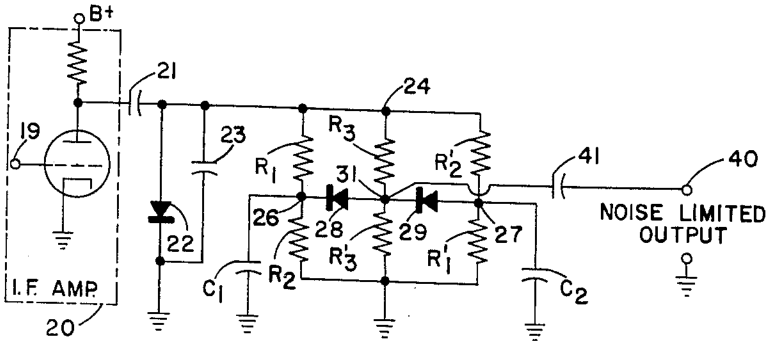

Further objects, features and advantages of this invention will be apparent to a person skilled in the art upon further study of the specification and the accompanying drawings, in which:

Figures 1 and 2 are waveforms used in illustrating the operation of the invention; and Figure 3 is a schematic illustration of a form of the invention.

Now referring to the figures for a more detailed explanation of the invention, Figure 1 illustrates an amplitude-modulated carrier signal having envelopes 10 and 11, with noise pulses superimposed thereon. Positive noise pulse 12 and negative noise pulse 13 are exemplary. Line O in Figure 1 represents the alternating-current axis of the radio-frequency wave. Thus, the positive portion of the signal and noise is above axis O, and the negative portion is below this axis.

A conventional linear detector will pass the carrier signal having one polarity. Thus, if it is assumed that the detector passes the positive portions of the signal above axis O, it attenuates its negative portion below the axis. With respect to Figure 1, such detection effectively clips off the wave below carrier A.C. axis O, passes, and smooths the positive wave portion as shown in Figure 2. There remains the upper envelope 10 of the signal, the positive noise peaks, and that portion of the negative noise peaks above axis O. Thus, the negative noise peaks are clipped at the 100 percent modulation level, since such level extends down to axis O.

In many amplitude-modulation systems the maximum percentage of modulation is substantially below 100 percent. Often, a modulation limit of 50 percent or less is used. In such case, the maximum swing of the upper sideband in Figure 1 is between lines *a* and *b*; and similarly, the maximum swing of the lower sideband will be between lines *c* and *d*.

Figure 2 illustrates the 50 percent modulation signal of Figure 1 after detection and with the carrier frequency removed. The A.C. axis O of Figure 1 now becomes D.C. axis O in Figure 2. The detected signal then has its own alternating-current axis which is line U in Figure 1 and which is determined by the average carrier level.

It is seen in Figure 2 that a substantial portion of the negative noise pulses, such as 13, remain in excess of the maximum negative swing *b* of the signal as determined by the 50 percent modulation limit of the received signal. This invention provides means for clipping the remaining noise peaks below line *b*; and furthermore, means are provided for clipping positive-noise pulses exceeding the maximum positive level *a*.

A schematic form of the invention is illustrated in Figure 3. It utilizes the output of an intermediate-frequency amplifier 20 in a receiver. Intermediate-frequency stage 20 is conventional, and need not be described in detail. Its input 19 is connected to a prior intermediate-frequency amplifier (not shown) in the receiver. Amplifier 20 has its output coupled through a blocking capacitor 21 to detector diode 22 which has one end grounded. A second capacitor 23 is connected across detector diode 22 to by-pass radio-frequency voltage components to ground.

The invention comprises three resistor paths connected in parallel between blocking capacitor 21 and ground. The resistors and blocking capacitor 21 in the circuit have a time constant that is long relative to the radio-frequency but short relative to the modulating frequencies. As a result, the voltage at point 24, which is across the three resistor paths, follows the modulating signal but also unavoidably follows the noise of the type in Figure 2.

The first resistor path includes resistors $R_1$ and $R_2$; the second resistor path includes resistors $R_3$ and $R_3'$; and the third resistor path includes resistors $R_2'$ and $R_1'$. A third capacitor $C_1$ is connected between ground and point 26 on the first resistor path. A similar capacitor $C_2$ is connected between ground and point 27 on the third resistor path. A first d ode 28 is connected between a point 31 on the second resistor path and point 26 on the first resistor path. Similarly, another diode 29 is connected between point 31 and point 27. Diodes 28 and 29 have opposite types of electrodes connected to point 31.

Capacitor $C_1$ and its resistors have a time constant that is long compared to the lowest modulat'ng frequency. Similarly, capacitor $C_2$ and its resistors have a time constant that is long compared to the lowest modulating frequency. Therefore, the voltages at points 26 and 27 cannot follow the modulating signal, but assume a direct-voltage dependent on the ratios of the resistors in their respective resistor paths and the average value of the detected voltage at po:nt 24.

However, the voltage at point 31 follows the modulating signal with its superimposed noise, and is always a fixed fractional value of the voltage at point 24 because of the voltage-divider relationship of the second resistance path.

Resistors $R_1$ and $R_2$ are proportioned to provide a voltage at point 26 that is above the voltage at point 31 by the given percentage of modulation. In a like but opposite manner resistors $R_2'$ and $R_1'$ are proportioned to provide a voltage at their point 27 which is below the voltage at point 31 also by the same percentage, which is the percentage of modulation at which shunt noise clipping is required.

Due to the long time constants associated with points 26 and 27, they will not follow the instantaneous fluctuation of the signal and noise. Rather, they assume voltages based upon the long-time value of the detected signal, which is its carrier level. Level U in Figure 2 is the average carrier level. Accordingly, the voltage at point 26 will be above the carrier level at point 31 by the given percentage and will be at level $a$ in Figure 2. Further, the voltage at point 27 will be below the carrier level at point 31 by the same percentage and will be at level $b$ in Figure 2. It is then realized that these percentages are directly related to the percentage of modulation of the received signal, since percentages of the carrier level provide the base for determining percentage of modulation.

Both diodes are normally biased below cutoff because their cathodes are connected to higher potential points than their anodes.

As long as the signal at point 31 remains within the voltage limits set at points 26 and 27, the diodes remain open and the signal transmission to output point 40 is not affected.

However, if a positive noise pulse occurs that exceeds the predetermined percentage of modulation, diode 28 opens at that upper modulation level $a$ and shunts the pulse to ground through capacitor $C_1$. Thus, in Figure 2, that portion of each positive noise pulse, such as 12, which exceeds level $a$ (shown in dashed lines) is clipped.

On the other hand, if a negative noise pulse occurs that exceeds the percentage of modulation, diode 29 opens at lower modulation level $b$ and shunts the pulse to ground through capacitor $C_2$. Thus, in Figure 2, that portion of each negative pulse, such as 13 in Figure 2, which exceeds level $b$ (shown in dashed lines) is clipped.

A mathematical simplification results in the invention by making resistors $R_3$ and $R_3'$ equal. Also, $R_1$ is equal to $R_1'$ and $R_2$ is equal to $R_2'$. In such case, the noise-clipping levels for both positive and negative noise peaks are determined by the following expression:

$$\text{Clipping percentage of modulation} = 100\left(1-\frac{2R_1}{R_1+R_2}\right) \quad (1)$$

In some cases, it may be required to have resistors $R_3$ and $R_3'$ not equal. In this case, the clipping levels are determined by the following expression:

$$\text{Clipping percentage of modulation} = 100\left[\left(\frac{R_2}{R_1+R_2}\right)\left(\frac{R_3+R_3'}{R_3}\right)-1\right] \quad (2)$$

An output terminal 40 is connected to point 31 through a blocking capacitor 41 to provide the noise limited output.

It is realized that this invention can also be used with detectors that are transformer coupled to the intermediate frequency stage.

Although this invention has been described with respect to a particular embodiment thereof, it is not to be so limited as changes and modifications may be made therein which are within the full intended scope of the invention as defined by the appended claims.

I claim:

1. A positive and negative noise-clipping circuit for a receiver having an intermediate-frequency amplifier, including a detector coupled to said intermediate-frequency amplifier, first, second and third voltage dividers respectively connected in parallel to the output of said detector, a first diode connected between intermediate points on said first and second dividers, with the average voltage at said connection to said first divider being higher than the average voltage at said connection to said second divider, a second diode connected between intermediate points on said second and third dividers, with the average voltage at said connection to said second divider being higher than the average voltage at said connection to said third divider, with the difference in average voltages between said connections to said first and third dividers being substantially equal to the opposite peak variations of said signal, a pair of capacitors respectively connected to said intermediate points on said first and third dividers to integrate the voltages at said connections, said diodes being connected in the backward polarized direction and being non-conducting during normal signal fluctuation, and a noise-limited output signal being taken from said intermediate point on said second divider.

2. A positive and negative shunt noise limiting circuit for a radio receiver having an intermediate-frequency amplifier, comprising detecting means coupled to the output of said intermediate-frequency amplifier; first, second and third voltage-divider circuits respectively connected in parallel to said detecting means, said second divider including a pair of resistors $R_3$ and $R_3'$ connected in series, said first divider including a pair of resistors $R_1$ and $R_2$, and said third divider including a pair of resistors $R_1'$ and $R_2'$ connected in series, with resistors $R_1$ and $R_3$ and $R_2'$ having an end connected in common, and resistors $R_2$, $R_3'$ and $R_1'$ also having an end connected together, one capacitor connected across resistor $R_2$, and another capacitor connected across resistor $R_1'$, a first diode connected between the other ends of resistors $R_1$ and $R_3$, a second diode connected between the other ends of resistors $R_2'$ and $R_3$, said diodes being connected with like polarity with respect to each other and normally being non-conducting, with the noise-limited output being obtained from the diode connections to resistor $R_3$, and the average voltage across said diodes being substantially equal to the peaks of said signal at its designated percentage of modulation.

3. A positive and negative noise-limiting circuit as defined in claim 2 wherein the percentage of modulation is related to the values of said resistors by the expression:

$$100\left[\left(\frac{R_2}{R_1+R_2}\right)\left(\frac{R_3+R'}{R_3}\right)-1\right]$$

4. A positive and negative noise limiting circuit for a radio receiver having an intermediate-frequency amplifier, comprising a blocking capacitor having one end connected to the output of said amplifier, a diode connected between the other end of said capacitor and ground, a radio-frequency shunting capacitor connected across said diode; first, second and third resistance dividers connected in parallel across said diode, said first divider comprising resistors $R_1$ and $R_2$ connected in series, said second divider comprising equal resistors $R_3$ and $R_3'$ connected in series, said third divider comprising resistors $R_1'$ and $R_2'$ connected in series, with resistors $R_1$ and $R_1'$ being equal, and resistors $R_2$ and $R_2'$ being equal, with resistors $R_2$, $R_3'$ and $R_1'$ each having an end connected to ground, one capacitor connected across resistor $R_2$, and another capacitor connected across resistor $R_1'$, a first diode connected between the ungrounded ends of resistors $R_2$ and $R_3'$, a second diode connected between the ungrounded ends of resistors $R_3'$ and $R_1'$, said diodes having opposite electrodes connected to the ungrounded end of resistor $R_3'$ and normally biased nonconducting by said voltage dividers, an output lead connected to said second voltage divider, with the percentage of modulation at which noise clipping occurs being given by the expression:

$$100\left(1-\frac{2R_1}{R_1+R_2}\right)$$

References Cited in the file of this patent

UNITED STATES PATENTS

| | | |
|---|---|---|
| 2,285,044 | Morris | June 2, 1942 |
| 2,293,835 | Landon | Aug. 25, 1942 |

UNITED STATES PATENT OFFICE
CERTIFICATION OF CORRECTION

Patent No. 2,961,532 November 22, 1960

Robert J. Rowley

It is hereby certified that error appears in the above numbered patent requiring correction and that the said Letters Patent should read as corrected below.

Column 4, lines 40 to 42, the equation should appear as shown below instead of as in the patent:

$$100\left[\left(\frac{R_2}{R_1 + R_2}\right)\left(\frac{R_3 + R'_3}{R_3}\right) - 1\right]$$

Signed and sealed this 2nd day of May 1961.

(SEAL)
Attest:

ERNEST W. SWIDER
Attesting Officer

DAVID L. LADD
Commissioner of Patents